(12) United States Patent
Lu

(10) Patent No.: US 9,124,789 B2
(45) Date of Patent: Sep. 1, 2015

(54) IMAGE SENSING MODULE AND ELECTRONIC DEVICE HAVING THE SAME

(75) Inventor: Kun-Yen Lu, Taipei (TW)

(73) Assignee: ABILITY ENTERPRISE CO., LTD., Taipei (TW)

(*) Notice: Subject to any disclaimer, the term of this patent is extended or adjusted under 35 U.S.C. 154(b) by 664 days.

(21) Appl. No.: 13/243,219

(22) Filed: Sep. 23, 2011

(65) Prior Publication Data

US 2012/0206643 A1  Aug. 16, 2012

(30) Foreign Application Priority Data

Feb. 16, 2011  (TW) .............................. 100105118 A (51) Int. Cl.
*H04N 5/225* (2006.01)

(52) U.S. Cl.
CPC ............ *H04N 5/2253* (2013.01); *H04N 5/2254* (2013.01)

(58) Field of Classification Search
CPC .......................... H04N 5/2254; H04N 5/2253
USPC ......... 348/373, 294, 335, 340, 374, 345, 343, 348/344
See application file for complete search history.

(56) References Cited

U.S. PATENT DOCUMENTS

| | | | |
|---|---|---|---|
| 6,416,240 B1 * | 7/2002 | Johnson | 396/505 |
| 6,834,161 B1 | 12/2004 | Stiehler | |
| 6,891,671 B1 * | 5/2005 | Greenberg | 359/388 |
| 6,992,699 B1 * | 1/2006 | Vance et al. | 348/207.99 |
| 7,697,061 B2 | 4/2010 | Chang | |
| 8,614,742 B2 * | 12/2013 | Stowe et al. | 348/143 |

FOREIGN PATENT DOCUMENTS

| | | |
|---|---|---|
| CN | 1464334 A | 12/2003 |
| CN | 1881067 A | 12/2006 |
| CN | 101080666 A | 11/2007 |
| JP | 2002258355 A | 9/2002 |
| JP | 2008035105 A | 2/2008 |
| JP | 2011095717 A | 5/2011 |
| TW | M343180 U | 10/2008 |
| WO | WO-2007019553 A2 | 2/2007 |

* cited by examiner

*Primary Examiner* — Ahmed A Berhan (74) *Attorney, Agent, or Firm* — Rabin & Berdo, P.C.

(57) ABSTRACT

An image capturing module and an electronic device having the same are disclosed. The image capturing module includes a swivel apparatus, a image sensor or photoelectric converter, and a lens. The swivel apparatus includes a carrying stage and a swivel mount. The image sensor or photoelectric converter is disposed on the carrying stage. The lens is connected to the swivel mount. The lens and the image sensor or photoelectric converter are relatively rotated by rotation of the swivel mount.

20 Claims, 11 Drawing Sheets

IMAGE SENSING MODULE AND ELECTRONIC DEVICE HAVING THE SAME

BACKGROUND OF THE INVENTION

1. Field of the Invention

The present invention generally relates to an image capturing module, and more particularly to an image capturing module which is applied in an electronic device.

2. Description of the Prior Art

With advances in technology, image capturing modules have become much more popular in digital products, such as digital cameras, digital video cameras, mobile phones, personal digital assistants (PDA), and so on. The image capturing module includes a lens device and a photoelectric conversion unit or image sensor. The lens device can focus images on the photoelectric conversion unit, and the photoelectric conversion unit can convert the optical signals into the electric signals.

The conventional lens device usually has a rectangular opening. The aspect ratio of the rectangular opening can be 4:3 or 16:9. The image of the captured object passes through the rectangular opening and forms a lateral rectangular image on the photoelectric conversion unit. Then, the photoelectric conversion unit can transfer the lateral rectangular image to the electric signals of the lateral photograph.

If the captured object is elongated vertically, the user usually needs to change the hand-held method of camera usage. For example, the camera can be rotated 90 degrees for taking a longitudinal photograph. However, the hand-held method of rotating the camera 90 degrees is not ergonomic; the camera can not be operated easily. Moreover, the camera may also be mounted on a tripod. The camera should be removed from the tripod for taking a longitudinal photograph. Or the tripod should be re-adjusted for taking a longitudinal photograph. Thus, a lot of time is wasted.

Because of the disadvantages of the prior art mentioned above, there is a need for an improved image capturing module that better meets consumer needs.

SUMMARY OF THE INVENTION

Accordingly, the present invention has been made in order to meet such a need described above, and it is an object of the present invention to provide an image capturing module so as to meet consumer needs.

In order to achieve the above object, one embodiment of the present invention provides an image capturing module. The image capturing module includes a swivel mechanism, an image sensor, and a lens. The swivel mechanism includes a carrying stage and a swivel mount. The image sensor or photoelectric converter is disposed on the carrying stage. The lens is connected to the swivel mount. The lens and the image sensor or photoelectric converter are relatively rotated by the swivel mount.

Another embodiment of the present invention provides an electronic device. The electronic device includes a main body, a swivel mechanism, an image sensor, and a lens. The main body includes an optical axis. The swivel mechanism includes a carrying stage and a swivel mount. The image sensor is disposed on the carrying stage. The lens is connected with the swivel mount. The lens rotates around the optical axis by the swivel mount.

By the image capturing module and the electronic device of the present invention, the user can rotate the lens directly for making the lens and the image sensor be relatively rotated so as to take a lateral photograph or a longitudinal photograph. There is no need for changing the hand-held method of camera usage. Therefore, the image capturing module and the electronic device of the present invention are ergonomic. And the image capturing module and the electronic device of the present invention can be operated easily.

DETAILED DESCRIPTION OF THE INVENTION

The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components.

The present invention generally relates to an image capturing module, which can be widely applied in many kinds of electronic devices which can capture video or still images. For example, the electronic devices can be image capturing systems, digital cameras, digital video cameras, mobile phones, personal digital assistants (PDA), webcams, and so on.

Figure 1:
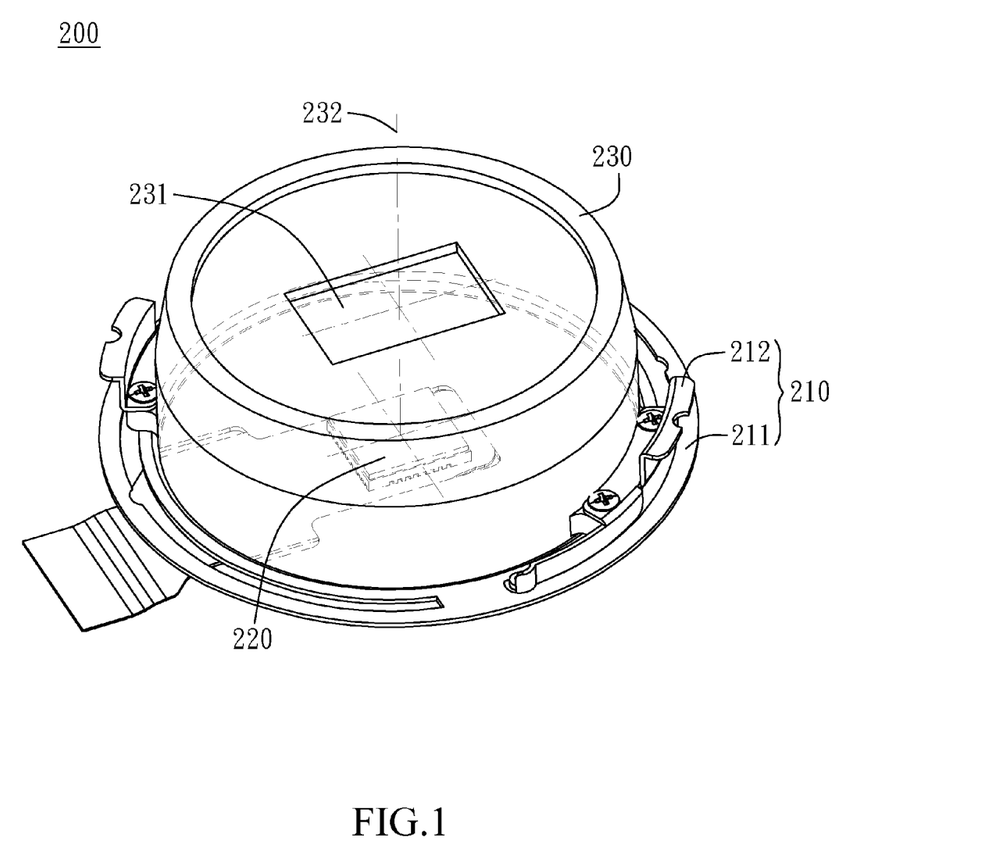
FIG. 1 shows the perspective view of an image capturing module in accordance with an embodiment of the present invention.

FIG. 1 shows the perspective view of an image capturing module 200 in accordance with an embodiment of the present invention. As shown in FIG. 1, the image capturing module 200 includes an image sensor or photoelectric converter 220 and a lens 230, including a lens body, a lens top, and a lens opening 231 in the lens top. The image capturing module 200 also includes a barrel or shaft-type swivel mechanism or apparatus 210 that enables the lens 230 to swivel, or rotate, relative and with respect to the image sensor 220.

Figure 2:
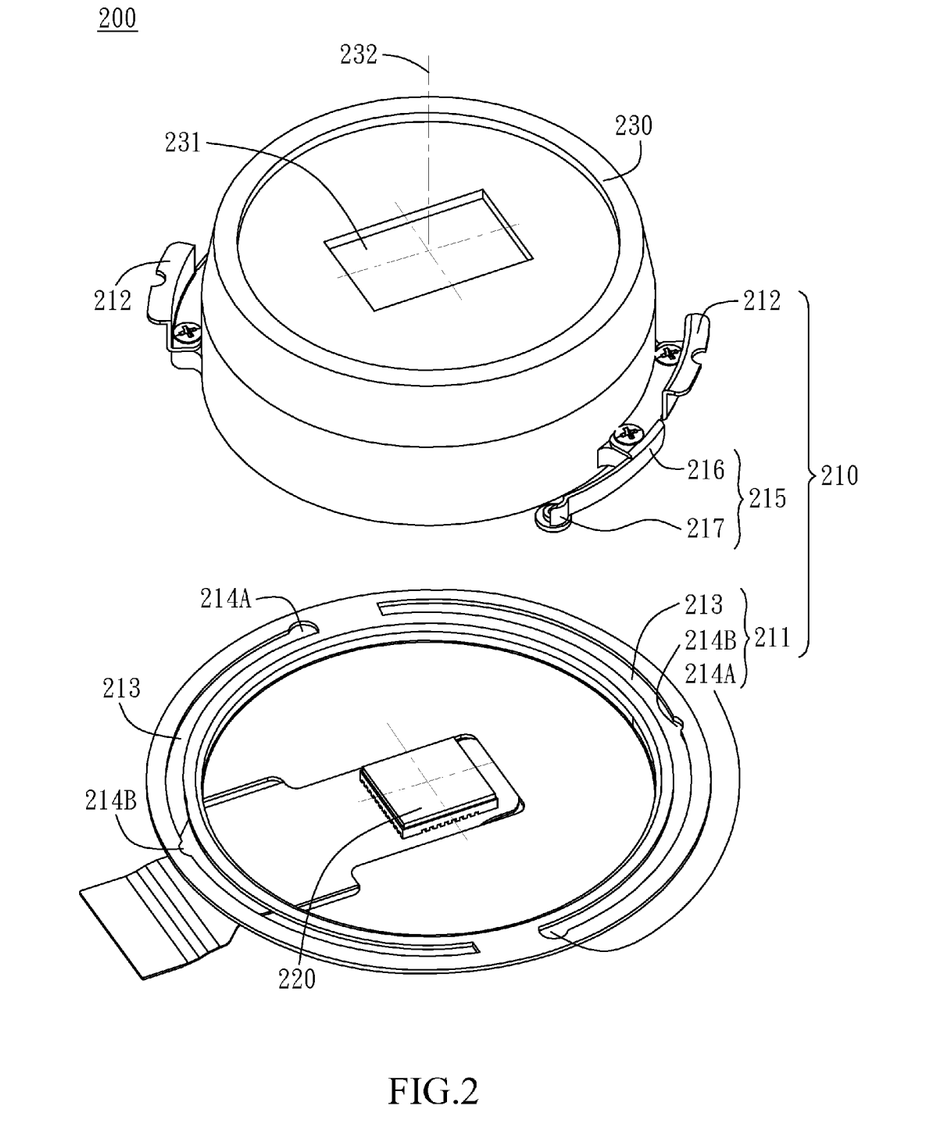
FIG. 2 shows the exploded perspective view of the image capturing module shown in FIG. 1.

FIG. 2 shows the exploded perspective view of the image capturing module 200 shown in FIG. 1. As shown in FIG. 2, the swivel apparatus 210 includes a carrying stage 211 and at least one swivel mount 212. The image sensor or photoelectric converter 220 is disposed on the carrying stage 211. The lens 230 includes an opening 231. The lens 230, and more particularly, the lens body, is connected to the swivel mount(s) 212. Thus, the lens 230 and the image sensor 220 can be rotated relative to each other through manipulation of the radially walled handle(s) of the swivel mount(s) 212. In this embodiment, the opening 231 is a rectangular opening, but the opening 231 is not limited to this configuration.

As shown in FIG. 2, the carrying stage 211 of the swivel apparatus 210 includes at least one radial arc-shaped track 213, and the swivel mount(s) 212 of the swivel apparatus 210 each include at least one extending structure or curved arm 215. The extending structure 215 is set within the track 213. Thus, the lens 230 and the image sensor 220 can be relatively rotated by the swivel mount(s) 212 of the swivel apparatus 210. Herein, each track 213 is a ring-shaped track so that the extending structure 215 can make the swivel mount(s) 212 move along the track 213. In this embodiment, each track 213 includes a detent mechanism comprising at least a first positioning port 214A and a second positioning port 214B. The first positioning port 214A and the second positioning port 214B are disposed at specific positions of the track 213 respectively. The first positioning port 214A and the second positioning port 214B can be concave grooves or notches for temporarily fixing the lens 230 at specific positions mentioned above.

As shown in FIG. 2, in this embodiment, when the extending structure 215 is clamped within the first positioning port 214A, the image capturing module 200 is capable of taking a lateral image. When the extending structure 215 is clamped within the second positioning port 214B, the lens 230 is rotated 90 degrees relative to the image sensor 220. Thus, the image capturing module 200 is capable of taking a longitudinal image. But not limited to this embodiment, the first positioning port 214A and the second positioning port 214B can be disposed at other specific positions so that the lens 230 is rotated to other angular positions relative to the image sensor or photoelectric converter 220. Specifically, two tracks 213 can be symmetrically disposed at the edge of the carrying stage 211 so that the carrying stage 211 can be uniformly forced when the lens 230 and the image sensor or photoelectric converter 220 are relatively rotated.

As shown in FIG. 2, according to this embodiment, the extending structure 215 includes a positioning portion 216 and a clamping portion 217. The positioning portion 216 is ring-shaped. Herein, the lens 230 includes an optical axis 232. The center of the image sensor or photoelectric converter 220 and the center of the track 213 are both aligned with the optical axis 232. The ring-shaped positioning portion 216 is set within the ring-shaped track 213 so that the center of the image sensor or photoelectric converter 220 is aligned with the optical axis 232 of the lens 230 fixedly. The ring-shaped positioning portion 216 and the ring-shaped track 213 perform the positioning function. When the lens 230 and the image sensor 220 are relatively rotated, the center of the image sensor 220 is aligned and coaxial with the optical axis 232 of the lens 230 fixedly without offset. Moreover, when the lens 230 rotates to the specific positions mentioned above relative to the image sensor 220, the clamping portion 217 of the extending structure 215 will be clamped within the first positioning port 214A or the second positioning port 214B for temporarily fixing the position of the lens 230.

In this embodiment, the extending structure 215 is a flexible member. The extending structure 215 has proper flexibility and spring resilience so that the extending structure 215 can deform with the shape of the track 213, the first positioning port 214A, or the second positioning port 214B. Thus, the extending structure 215 having proper flexibility can move along the track 213 so as to make the lens 230 and the image sensor 220 be relatively rotated. Also, the extending structure 215, due to its spring resilience, can be clamped within the first positioning port 214A or the second positioning port 214B for temporarily fixing the position of the lens 230. Herein, the flexible member can be a metal member which is made by a sheet metal forming process, but not limited to this. The flexible member can be a plastic member or a rubber member.

By the design mentioned above, the user can rotate the lens 230 directly for making the lens 230 and the image sensor 220 be relatively rotated so as to take a lateral photograph or a longitudinal photograph. There is no need for changing the hand-held method of camera usage. Therefore, the electronic device having the image capturing module 200 is ergonomic. The electronic device having the image capturing module 200 can be operated easily. Moreover, the electronic device having the image capturing module 200 can meet consumer needs for the electronic device.

Figure 3:
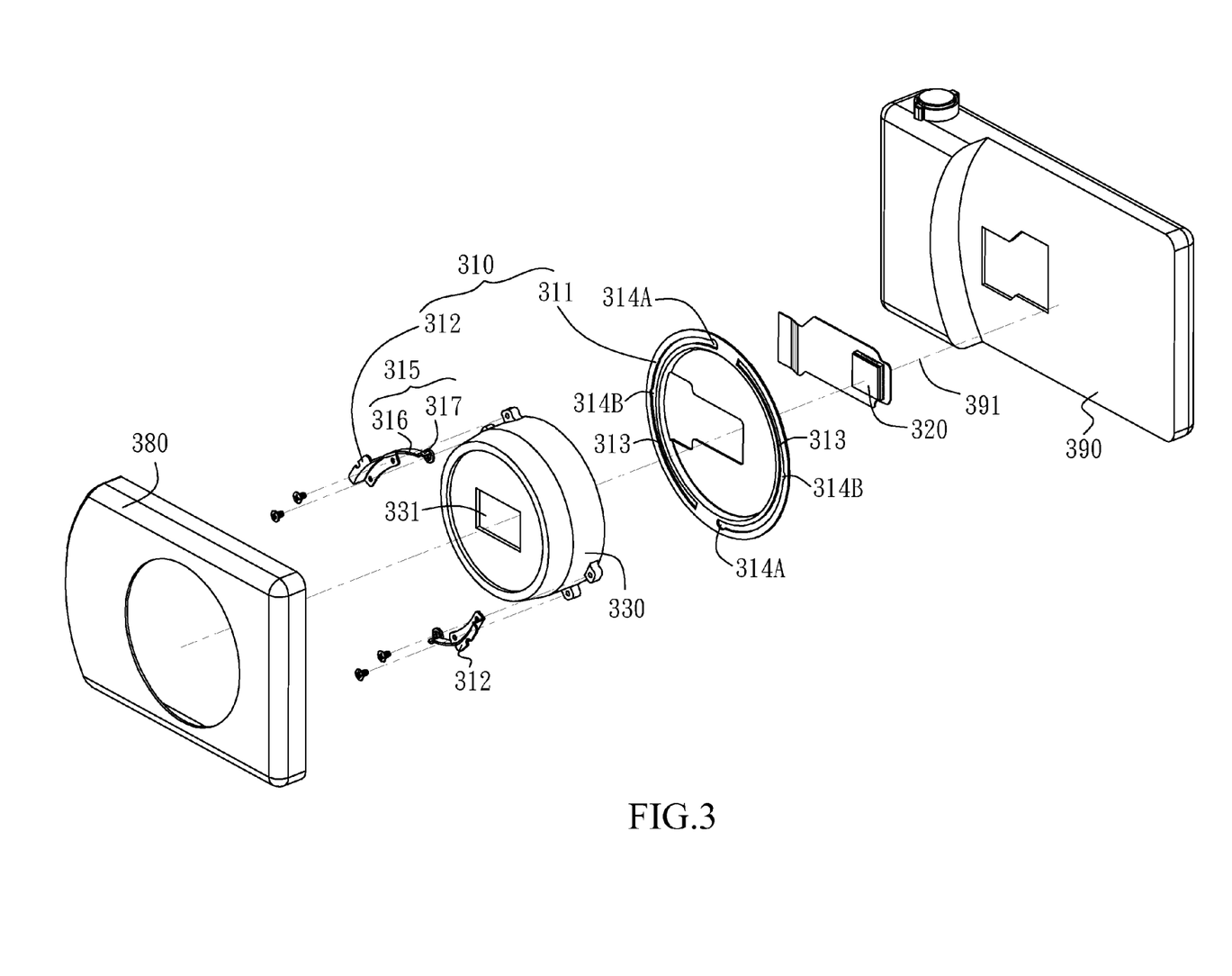
FIG. 3 shows the exploded perspective view of an electronic device in accordance with another embodiment of the present invention.

FIG. 3 shows the exploded perspective view of an electronic device 300 in accordance with another embodiment of the present invention. The electronic device 300 includes a main body 390, a swivel apparatus 310, an image sensor or photoelectric converter 320, and a lens 330. The main body 390 includes an optical axis 391. The swivel apparatus 310 includes a carrying stage 311 and at least one swivel mount 312. The image sensor 320 is disposed on the carrying stage 311. The lens 330 has a rectangular opening 331, and the lens 330 is connected with the swivel mount 312. The lens 330 rotates around the optical axis 391 by the swivel mount 312.

In this embodiment, the electronic device 300 can further include a front cover 380 for decorating the shape of the electronic device 300, but the device 300 is not limited to this. The electronic device 300 can exclude the front cover 380. Moreover, the electronic device 300 can be any kind of device which can capture video or still images. For example, the electronic device 300 can be a digital camera, a digital video camera, a mobile phone, a personal digital assistants (PDA), a webcam, and so on.

As shown in FIG. 3, the carrying stage 311 includes at least one track 313, and the swivel mount 312 is set within the track 313. Thus, the lens 330 and the image sensor 320 can be relatively rotated by the swivel mount 312. In this embodiment, the track 313 includes a first positioning port 314A and a second positioning port 314B. The first positioning port 314A and the second positioning port 314B are disposed at specific positions of the track 313 respectively. The first positioning port 314A and the second positioning port 314B can be concave grooves or notches for temporarily fixing the lens 330 at specific positions mentioned above.

As shown in FIG. 3, in this embodiment, when the swivel mount 312 is clamped within the first positioning port 314A, the electronic device 300 is capable of taking a lateral image. When the swivel mount 312 is clamped within the second positioning port 314B, the lens 330 is rotated 90 degrees relative to the image sensor or photoelectric converter 320. Thus, the electronic device 300 is capable of taking a longitudinal image. The first positioning port 314A and the second positioning port 314B can also be disposed at other specific angular positions so that the lens 330 is rotated a user-selectable amount relative to the image sensor 320.

The swivel mount 312 includes at least one extending structure 315. The extending structure 315 includes a positioning portion 316 and a clamping portion 317. The extending structure 315 is similar to the extending structure 215 shown in FIG. 2. The same description of the extending structure 215 will not repeated here again.

Figure 4A:
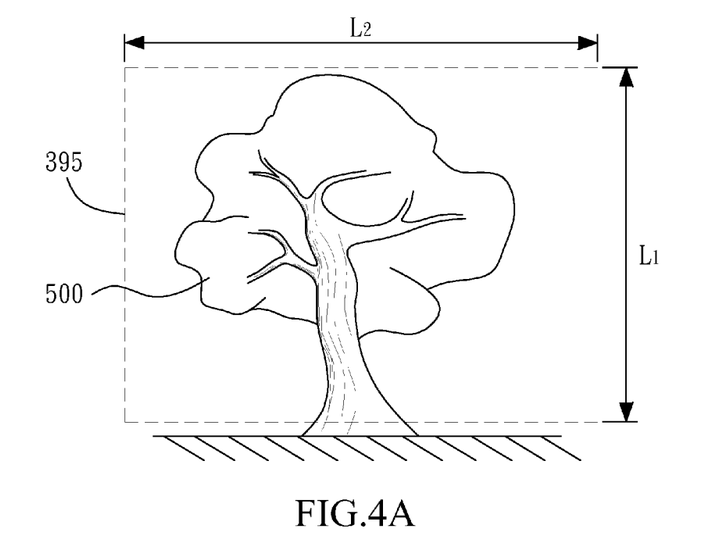
FIGS. 4A-4C show the operation method of the electronic device for capturing a lateral image.
Figure 4B:
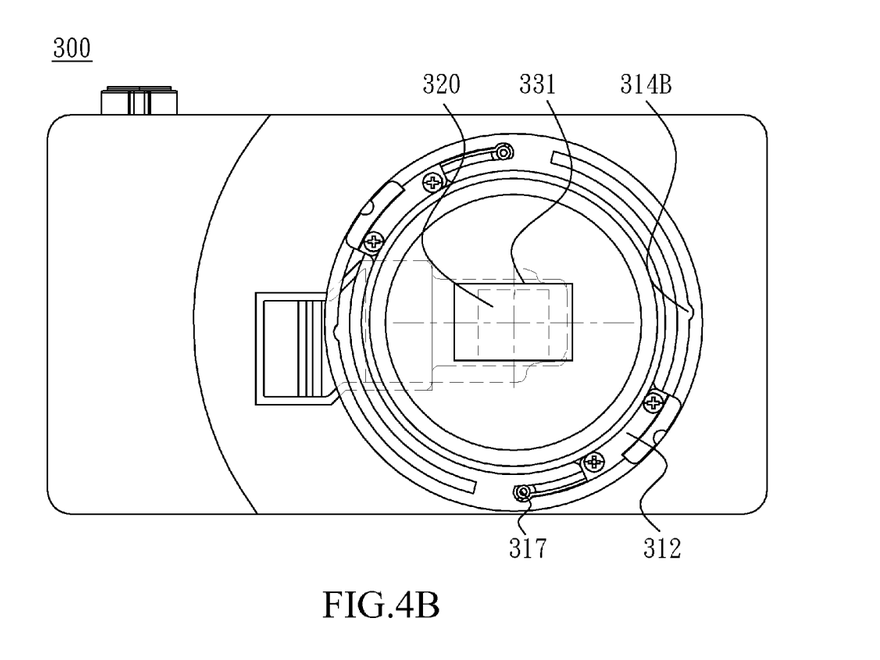
Figure 4C:
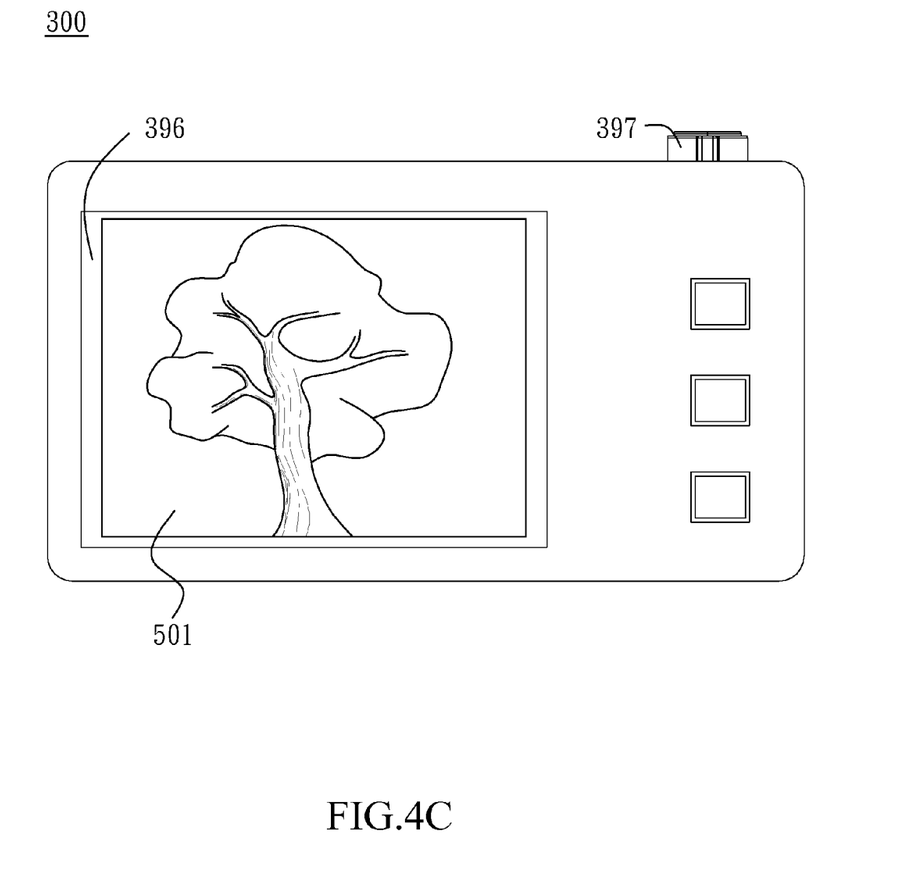

FIGS. 4A-4C show the operation method of the electronic device 300 for capturing a lateral image. First, the user operates the electronic device 300 for showing a preview image of the captured object 500 within the capturing area 395 of the electronic device 300. Herein, the opening 331 is shown as a lateral rectangle. The capturing area 395 is a lateral rectangle because of the opening 331. The rectangle has a longitudinal length L1 and a lateral length L2. Specially, the ratio of the lateral length L2 and the longitudinal length L1 can be 4:3 or 16:9.

Then, as shown in FIG. 4B and FIG. 4C, the clamping portion 317 of the swivel mount 312 is clamped within the first positioning port 314A for temporarily fixing the position of the lens 330. Thus, light emanating or reflected from the captured object 500 passes through the opening 331 of the lens 330 and is projected on the image sensor 320. A lateral image 501 which has a lateral rectangular frame is shown on a display screen 396 of the electronic device 300. Finally, the user can press a capturing button 397. After capturing video or still images, the image data of the lateral image 501 is stored by the electronic device 300.

Figure 5A:
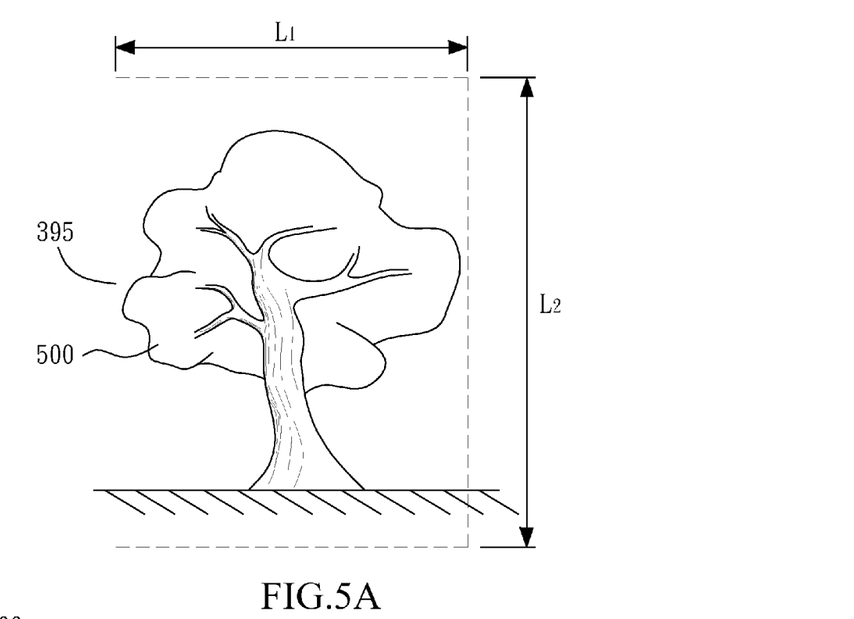
FIGS. 5A-5C show the operation method of the electronic device for capturing a longitudinal image.
Figure 5B:
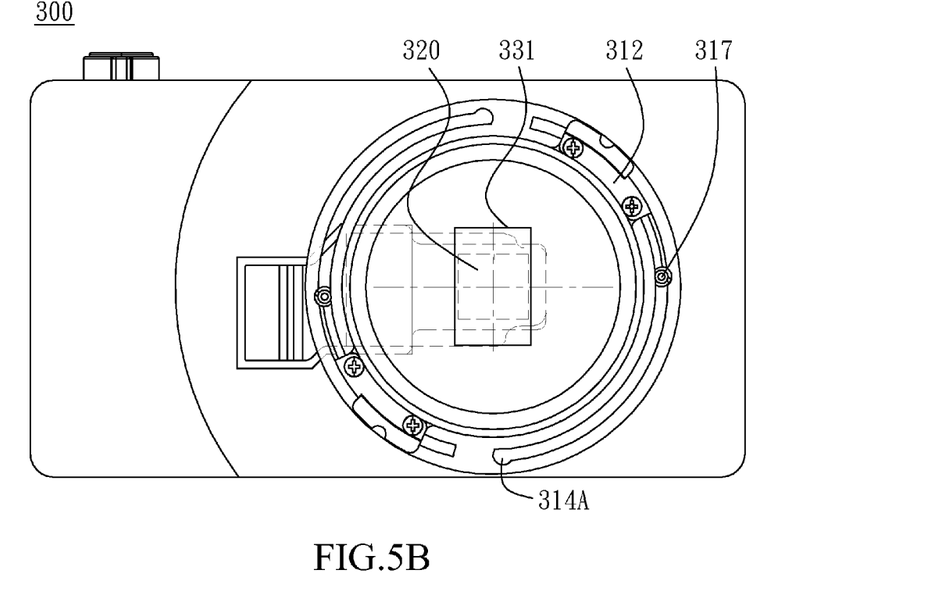
Figure 5C:
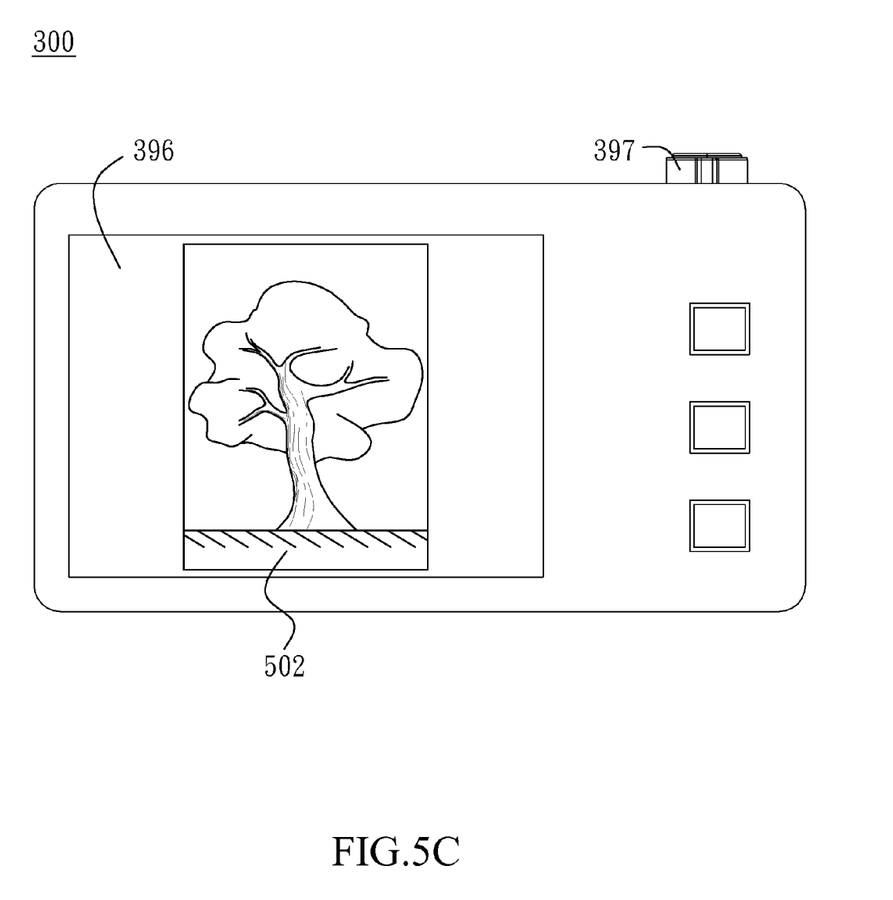

FIGS. 5A-5C show the operation method of the electronic device 300 for capturing a longitudinal image. First, as shown in FIG. 5B, the user can rotate the lens 330 directly for making the lens 330 rotate 90 degrees relative to the image sensor or photoelectric converter 320. Herein, the opening 331 is shown as a longitudinal rectangle. The clamping portion 317 of the swivel mount 312 is moved from the first positioning port 314A to the second positioning port 314B. The clamping portion 317 is clamped within the second positioning port 314B for temporarily fixing and resiliently holding the position of the lens 330.

Then, as shown in FIG. 5A, the user operates the electronic device 300 for showing a preview image of the captured object 500 within the capturing area 395 of the electronic device 300. Then, as shown in FIG. 5B and FIG. 5C, the light emanating or reflected from the captured object 500 pass through the opening 331 of the lens 330 and is projected onto the image sensor or photoelectric converter 320. A longitudinal image 502 which has a longitudinal rectangular frame is shown on a display screen 396 of the electronic device 300. Finally, the user can press a capturing button 397. After capturing video or still images, the image data of the lateral image 502 is stored by the electronic device 300.

Figure 6A:
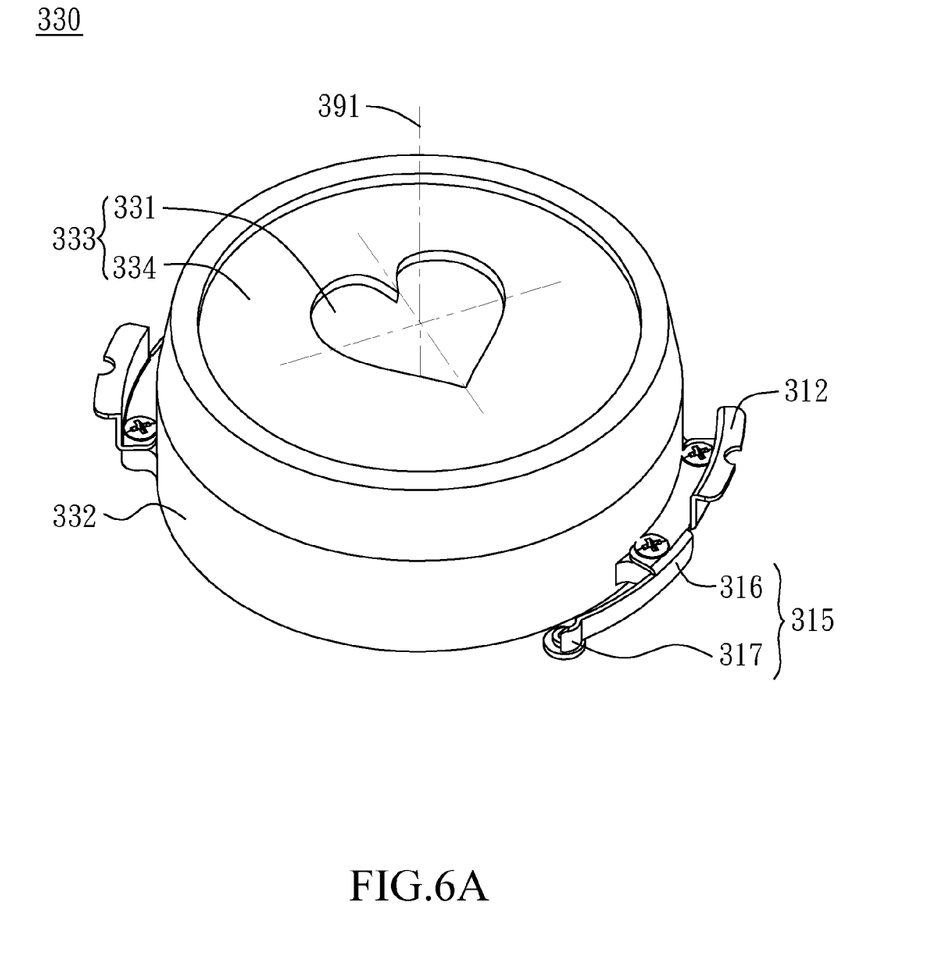
FIG. 6A shows the perspective view of a lens in accordance with another embodiment of the present invention.

FIG. 6A shows the perspective view of a lens 330 in accordance with another embodiment of the present invention. As shown in FIG. 6A, lens 330 includes a lens barrel 332 and a lens cover 333. The lens cover 333 includes a shading plate 334 which is orthogonal to the optical axis 391. A specially configured opening 331 is disposed on the shading plate 334. When the extending structure 315 of the swivel mount 312 moves along the track 313 for making the lens 330 and the image sensor or photoelectric converter 320 be relatively rotated, the opening 331 is rotated accordingly for making the frame, which projects light to the image sensor 320, rotate accordingly. Herein the lens cover 333 is screw-jointed or clamped with the lens 332. The lens cover 333 can be removed or assembled by the user manually. The opening 331 can be any kinds of shape. For illustration only, the opening 331 is heart-shaped in this embodiment.

Figure 6B:
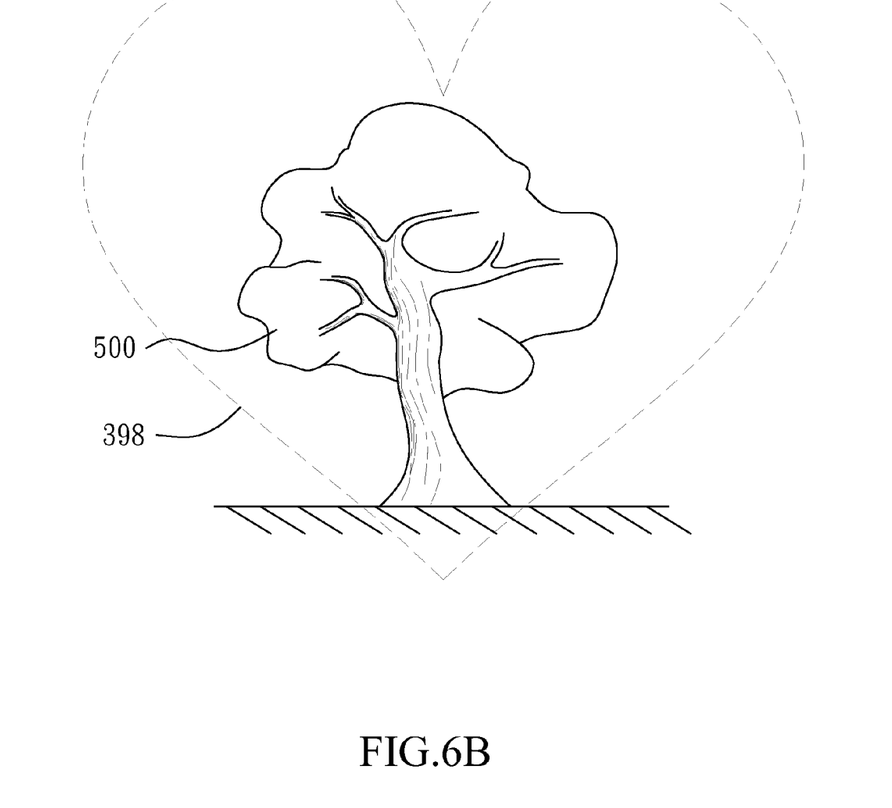
FIGS. 6B-6C show the operation method of capturing an image by using the lens shown in FIG. 6A.
Figure 6C:
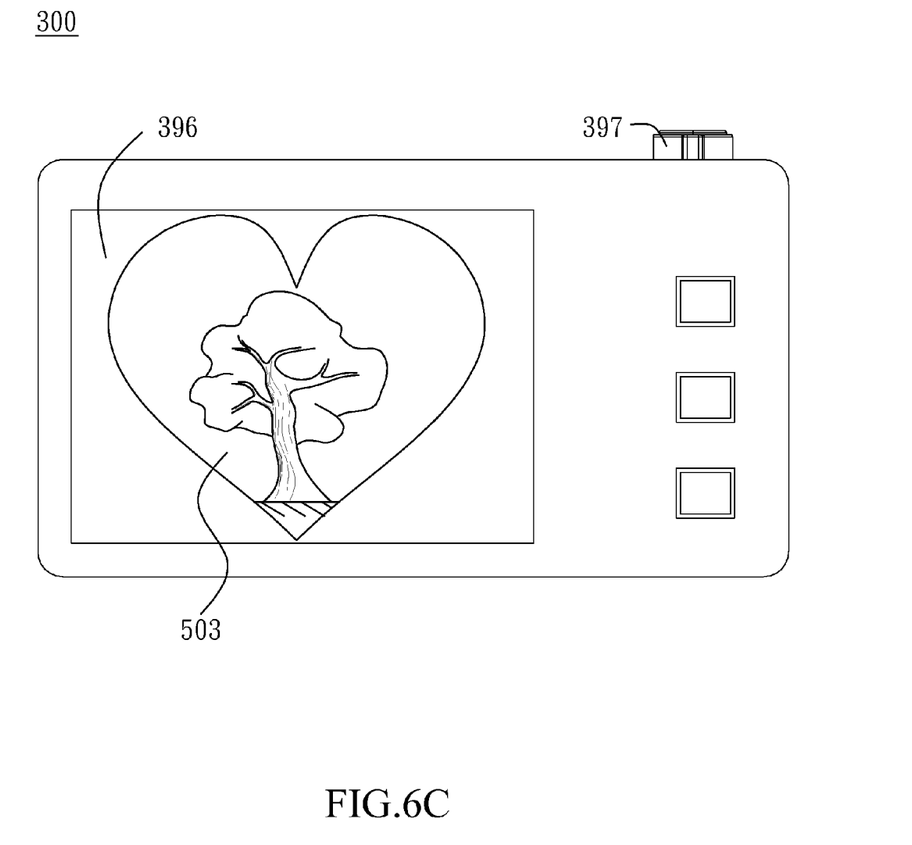

FIGS. 6B-6C show the operation method of capturing an image by using the lens 330 shown in FIG. 6A. Referring to FIGS. 6A-6C, because the opening 331 is heart-shaped, when the light of the captured object 500 passes through the opening 331 of the lens 330 and is projected onto the image sensor 320, a heart-shaped image 503 which has a heart-shaped frame 398 is shown on the display screen 396. Finally, the user can press a capturing button 397. After capturing video or still images, the image data of the heart-shaped image 503 is stored by the electronic device 300. Moreover, the user can rotate the lens 330 according to needs for making the opening 331 rotate relative to the image sensor 320 so as to make the heart-shaped image 503 rotate accordingly.

Figure 6D:
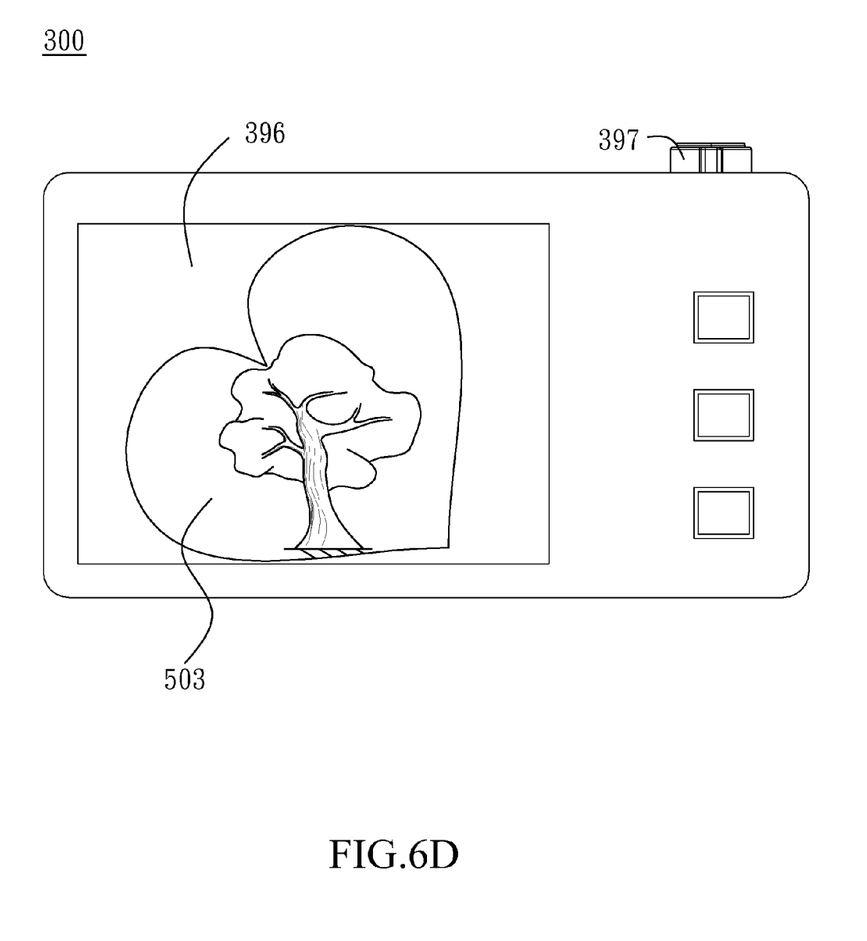
FIG. 6D shows the captured image by using the lens which is rotated 45 degrees.

FIG. 6D shows the captured image by using the lens 330 which is rotated 45 degrees. Referring to FIG. 6C and FIG. 6D, when the user rotates the lens 330 45 degrees, the opening 331 rotates 45 degrees relative to the image sensor 320 accordingly. Thus, the heart-shaped image 503 also rotates 45 degrees. The heart-shaped image 503 which rotates 45 degrees is shown on the display screen 396. Finally, the user can press a capturing button 397. After capturing video or still images, the image data of the heart-shaped image 503 is stored by the electronic device 300.

By the design mentioned above, the user can rotate the lens 330 directly for making the lens 330 and the image sensor 320 be relatively rotated so as to change the frame of the captured image. There is no need for changing the hand-held method of the electronic device 300. Therefore, the electronic device 300 is ergonomic. The electronic device 300 can be operated easily. Moreover, the electronic device 300 can meet consumer needs for the electronic device.

Although specific embodiments have been illustrated and described, it will be appreciated by those skilled in the art that various modifications may be made without departing from the scope of the present invention, which is intended to be limited solely by the appended claims.

What is claimed is:

1. An image capturing module, comprising:
 a swivel apparatus comprising a carrying stage and a swivel mount;
 an image sensor disposed on said carrying stage; and
 a lens fixedly connected to said swivel mount;
 wherein said lens is rotatable relative to said image sensor, and a plane of rotation of said lens is coplanar while said lens rotates; and
 wherein a center of said image sensor is substantially aligned with an optical axis of said lens.

2. The image capturing module according to claim 1, wherein said carrying stage comprises at least one track, said swivel mount comprises at least one extending structure, and said extending structure is set within said track.

3. The image capturing module according to claim 2, wherein said track comprises at least one positioning port, said extending structure is resiliently held within said track by said positioning port.

4. The image capturing module according to claim 3, wherein said positioning port is a concave groove.

5. The image capturing module according to claim 3, wherein said extending structure comprises a positioning portion and a clamping portion, and when said lens and said image sensor are relatively rotated to said positioning port, said clamping portion is resiliently held within said positioning port.

6. The image capturing module according to claim 2, wherein said track is a ring-shaped track.

7. The image capturing module according to claim 2, wherein said extending structure is a flexible and resilient member.

8. The image capturing module according to claim 7, wherein said flexible member is a metal member, a plastic member, or a rubber member.

9. The image capturing module according to claim 8, wherein said metal member is made by a sheet metal forming process.

10. An electronic device comprising the image capturing module claimed in claim 1.

11. An electronic device, comprising:
 a main body comprising an optical axis;
 a swivel apparatus comprising a carrying stage and a swivel mount;

an image sensor disposed on said carrying stage; and a lens connected to said swivel mount, said lens relatively rotatable by said swivel mount in a plane essentially perpendicular to said optical axis, and the plane of rotation of said lens is coplanar while said lens rotates; and wherein a center of said image sensor is substantially aligned with an optical axis of said lens.

12. The electronic device according to claim 11, wherein said carrying stage comprises at least one track, said swivel mount comprises at least one extending structure, and said extending structure is set within said track.

13. The electronic device according to claim 12, wherein said track comprises at least one positioning port for positioning said extending structure.

14. The electronic device according to claim 13, wherein said positioning port is a concave groove, said swivel mount makes said lens rotate to said concave groove relative to said image sensor for making said clamping portion be resiliently held within said positioning port.

15. The electronic device according to claim 12, wherein said extending structure comprises a positioning portion and a clamping portion, said positioning portion makes said lens rotate around said optical axis of said main body relative to said image sensor, and when said lens rotates to said positioning port relative to said image sensor, said clamping portion is resiliently held within said positioning port.

16. The electronic device according to claim 12, wherein said extending structure is a flexible member.

17. The electronic device according to claim 16, wherein said flexible member is a metal member, a plastic member, or a rubber member.

18. The electronic device according to claim 12, wherein said track is a ring-shaped track.

19. The electronic device according to claim 11, wherein said lens comprises an opening, said opening rotates with said lens for rotating a frame which is projected to said image sensor.

20. The electronic device according to claim 19, wherein said lens comprises a lens barrel and a lens cover, said opening is disposed on said lens cover, and said lens cover is screw-jointed or clamped with said lens.

* * * * *